Patented June 27, 1933

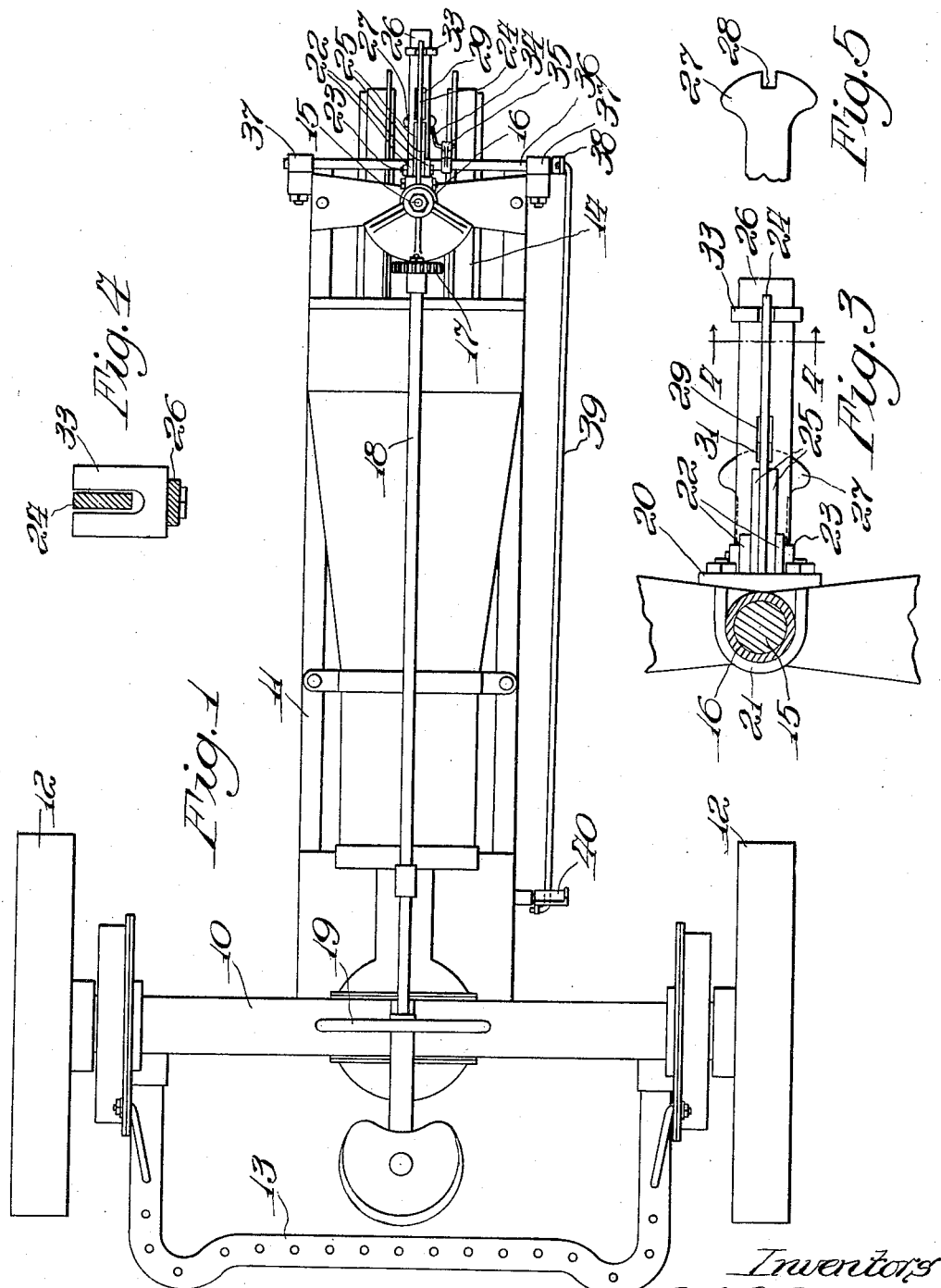

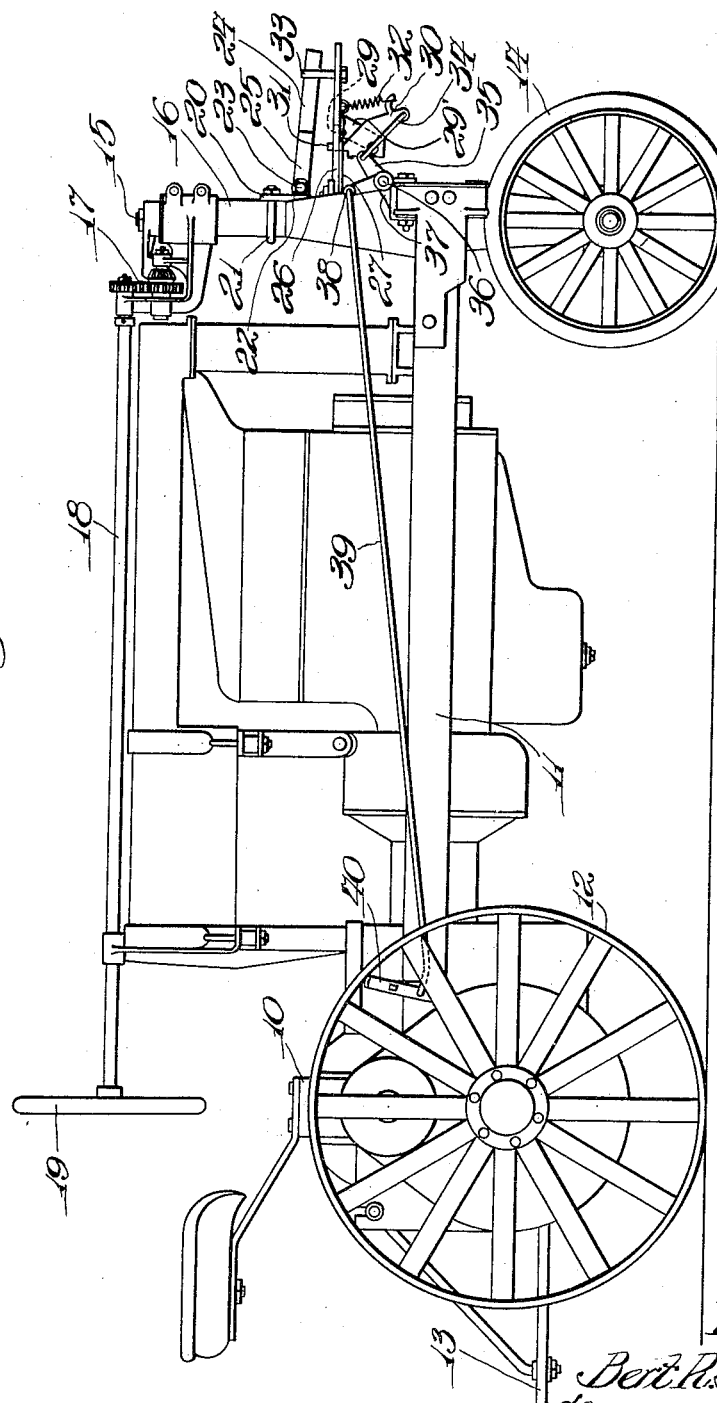

1,915,285

UNITED STATES PATENT OFFICE

BERT R. BENJAMIN, OF OAK PARK, AND SHERMAN W. CADY, OF CANTON, ILLINOIS, ASSIGNORS TO INTERNATIONAL HARVESTER COMPANY, A CORPORATION OF NEW JERSEY

TRACTOR STEERING CONTROL

Application filed December 2, 1931. Serial No. 578,444.

The present invention relates to means for controlling the direction of travel of a tractor of the general purpose type, particularly when a tractor of that type is used with implements that require a substantially straight line of travel to be maintained.

Many tractors of the so-called general purpose or row-crop type are supported at the front on a dirigible truck usually of narrow tread and steered by freely movable steering gear, so that short turns of the tractor and quick dodging during cultivation of row crops can be effected with minimum effort. Under other uses of the tractor, as when plowing, the free steering is detrimental, as it makes it necessary for the operator to maintain a firm hold on the steering wheel at all times during the plowing operation.

The objects of the present invention are to provide a simple device, adapted to be mounted on standard types of tractors, which will automatically hold the dirigible truck on a substantially straight path and permit it to be steered within a limited range, if desired, and also permit ready disconnection of the holding device when a short turn of the tractor is to be made.

A preferred embodiment of the invention for accomplishing the above and other minor objects is hereinafter described and illustrated in the accompanying drawings, where:

Figure 1 is a plan view of a general purpose tractor of a well known type embodying the invention;

Figure 2 is a side view of the same;

Figure 3 is an enlarged detail view in plan of the steering control device of the present invention;

Figure 4 is a detail view on line 4—4 of Figure 3; and,

Figure 5 is a detail view of the front end of one of the arms entering into the construction of the steering control.

In the present instance the invention is illustrated as in combination with a general purpose or row crop tractor of the type having an upright arched rear axle structure 10 and a central, forwardly extending body 11. The axle structure is supported on traction wheels 12 and carries a rearwardly extending drawbar 13. The body portion 11 of the tractor is composed of side sills supporting the usual power plant including the clutch and transmission housings. The front end of the body portion 11 is supported on a dirigible truck 14 which has an upright standard 15 journaled in a sleeve 16 forming a portion of a front crosshead connecting the side sills of the tractor body. A suitable train of gears 17 connects the upper end of the standard 15 with a steering shaft 18 on the rear end of which the steering wheel 19 is secured.

In the practice of the present invention, a bracket or base plate 20 is secured to the sleeve 16, as by a U-bolt 21. The base plate 20 has a pair of forwardly projecting, spaced ears 22 thereon, between which there is secured, as by bolt 23, a forwardly extending leaf spring member or arm 24, which may be reenforced by shorter spring arms 25 at each side. On an exposed portion of the standard 15, just below the sleeve 16, the standard has journaled thereon a forwardly extending member or arm 26, which is approximately of the same length as the spring arm 24. This arm 26, which is rotatable on the standard 15, rests upon a lower, forwardly extending member 27 which is fixed on the standard 16 and must swing laterally therewith when steering movements are imparted to the truck. The member 27 is comparatively short and formed with a notch 28 in its forward end, which notch registers with a slot 29 formed in the movable arm 26 when arm 26 and member 27 are both in forward position. On its under side the movable arm 26 has fixed to it a depending bracket 29', on which there is pivoted a latch member 30. The pivot of the latch member is on a transverse axis and said latch member is formed with an upwardly extending lug or nose 31 extending through the slot 29 in the arm 26. A coil spring 32 normally urges the latch member in a direction to cause the nose 31 to engage the notch 28 in the end of member 27 to normally lock member 27 and arm 26 together. Under these conditions the two arms will move together to either the right or left as the standard turns during steering movements of the truck. At its front end the arm 26 is provided with an upright, forked yoke piece 33, between the arms of which the free end of the spring arm 24 engages loosely. In order to afford control of the latch 30 from the operator's station on the rear of the tractor, the lower end of the latch member 30 is connected as by a loose link 34 with an arm 35 secured to a rockshaft 36 mounted in suitable bearings 37 on the front end of the tractor. At one end the shaft 36 has fixed to it a crank arm 38 which has a rearwardly extending control rod 39 pivoted to it, and this rod at its rear end is pivoted to a pedal lever 40 adjacent the operator's station.

With the construction above described the arms 26 and 27, when in the position shown in the drawings, will be locked together, and movement thereof in a horizontal plane will be resisted after a slight degree of free movement by the spring arm 24, which will, however, yield to permit a certain degree of lateral movement of the arms and, therefore, a limited range of steering movement. Normally, however, the spring arm 24 will serve to hold these arms and, therefore, the steering truck in position for straight forward movement and will return the truck to such position, should roughness of the ground tend to swing it to either the right or left. This will permit the steering wheel 19 to be released or only lightly held when the tractor is to remain in a straight forward path. Should slight turning movements be desired, the spring arm 24 can be flexed to some degree under operation of the steering gear and, should a short turn be desired, the operator can release the arm 26 from the member 27 by withdrawing the latch 30, whereupon the member 27 can swing free of the arm 26 and the short turn be made. Upon return of the member 27 to straight forward position, the latch will automatically reengage and the function of straight forward control of movement be resumed.

It will accordingly be seen that a simple and efficient device for controlling the steering movement of a tractor has been provided and that the preferred embodiment of the invention herein disclosed will be capable of certain modifications without departure from the scope of the invention as defined in the following claims.

What is claimed is:

1. The combination with a tractor having a dirigible front end support including a vertical bearing sleeve fixed on the tractor and a standard connected to the dirigible support and journaled in said sleeve, of means for yieldably holding the standard against rotation in the sleeve comprising a member extending away from the standard and fixed thereto, a second member movable on the standard and normally extending in parallel relation to the fixed member, latch mechanism mounted on one of said members and engageable with the other including means for actuating the latch mechanism to disconnect said members at will, and a resilient holding element mounted on the sleeve and connected to the movable member.

2. The combination of claim 1, in which the latch mechanism is actuated by means of a trip lever located adjacent the operator's station on the tractor and connected to the latch mechanism.

3. The combination with a tractor having a dirigible front truck, a vertical bearing sleeve fixed on the tractor and a standard extending upwardly from the truck and journaled in the sleeve, of a forwardly projecting spring arm secured to the sleeve and yieldable horizontally, a complemental member movable with the standard and extending parallel to the spring arm and normally lying in a common vertical plane therewith, and means for connecting the end of the spring arm to the complemental member.

4. The combination with a tractor having a dirigible front end support including a vertical bearing on the tractor and a standard connected to the dirigible support and journaled in said bearing, of means for yieldably holding the standard against rotation in the bearing comprising a member extending away from the standard, a resilient holding member mounted on the bearing and connected to the member on the standard, and a connection between the member on the standard and the holding member on the bearing comprising a latch mechanism operable at will to release said connection.

In testimony whereof we affix our signatures.

BERT R. BENJAMIN.
SHERMAN W. CADY.